United States Patent [19]
Lee et al.

[11] Patent Number: 5,699,674
[45] Date of Patent: Dec. 23, 1997

[54] METHOD FOR CONTROLLING TEMPERATURE IN A CHAMBER OF A FOOD STORAGE APPARATUS

[75] Inventors: Young-Gil Lee, Asan; Beom-Geol Ryu, Pyongtaek, both of Rep. of Korea

[73] Assignee: Mando Machinery Corp., Kyongki-Do, Rep. of Korea

[21] Appl. No.: 632,988

[22] Filed: Apr. 16, 1996

[30] Foreign Application Priority Data

May 10, 1995 [KR] Rep. of Korea ...................... 95-11347

[51] Int. Cl.$^6$ ........................................................ F25B 1/00
[52] U.S. Cl. ............................. 62/115; 62/157; 62/229
[58] Field of Search ........................... 62/229, 231, 157, 62/115

[56] References Cited

U.S. PATENT DOCUMENTS

| | | | |
|---|---|---|---|
| 4,726,160 | 2/1988 | Kawaguchi et al. | 62/157 |
| 4,903,502 | 2/1990 | Hanson et al. | 62/229 X |
| 4,949,548 | 8/1990 | Meyer | 62/229 X |

*Primary Examiner*—Henry A. Bennett
*Assistant Examiner*—Susanne C. Tinker

*Attorney, Agent, or Firm*—Anderson Kill & Olick, P.C.

[57] ABSTRACT

A method for controlling temperature in a chamber of a food storage apparatus comprises: (a) inputting a lower and an upper temperature limits T1 and T2, a predetermined elapsed time t1 of the chamber storing a normal amount of food needed for the temperature of the chamber to reach T1 after an initial activating of a cooling device, a predetermined temperature restoring time t3 for the temperature of the chamber to reach T2 from an initial deactivating of the chamber, a plurality of compensating values, and a plurality of reference values; (b) setting a variable A to T1; (c) activating the cooling device; (d) measuring an elapsed time t1' for the temperature of the chamber to reach T1 after an initial activating of the cooling device; (e) comparing the elapsed time t1' with t1 (f) setting the variable A to T1' if t1' is longer than t1; (g) deactivating the cooling device at an instant when the temperature of the chamber reaches the variable A; (h) activating the cooling device again at an instant when the temperature of the chamber is increased by ΔT; (i) measuring a temperature restoring time t3' from the deactivating time to the subsequent activating time of the cooling device and comparing it with t3; (j) comparing a difference Δt3 between t3' and t3 with the reference values, and setting the variable A to one of the compensating values if t3' is less than t3, otherwise setting the variable A to T1.

10 Claims, 8 Drawing Sheets

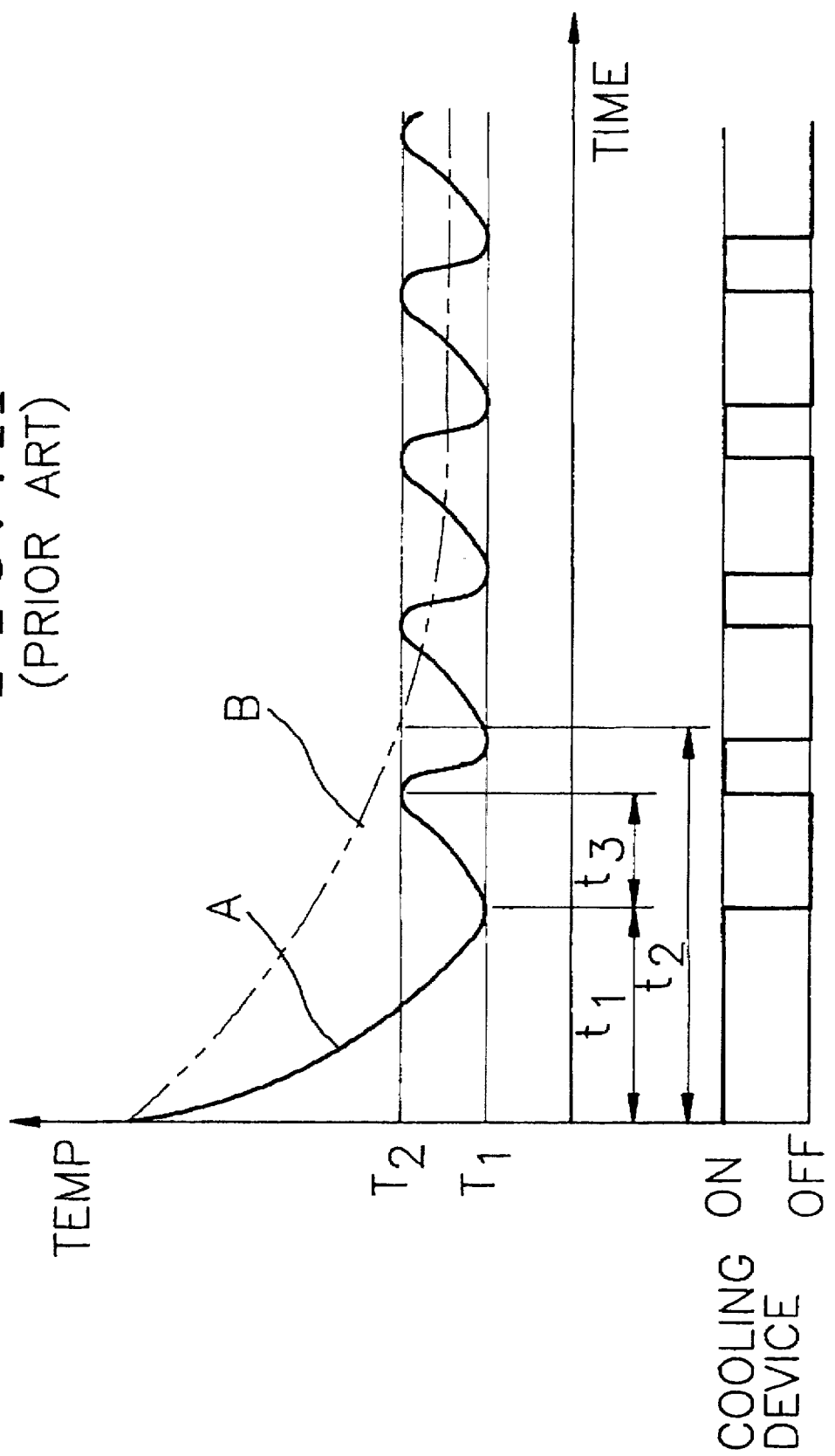

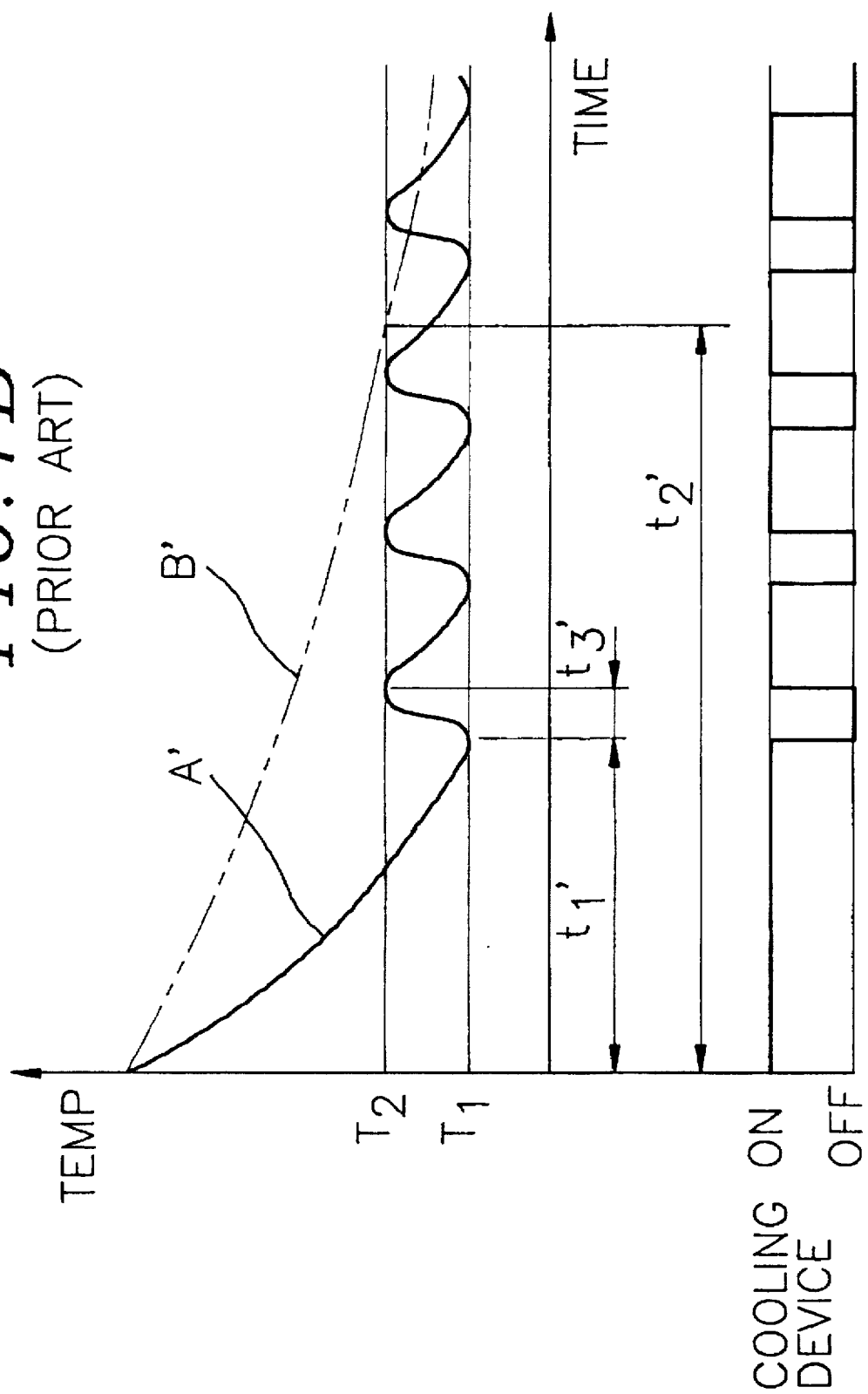

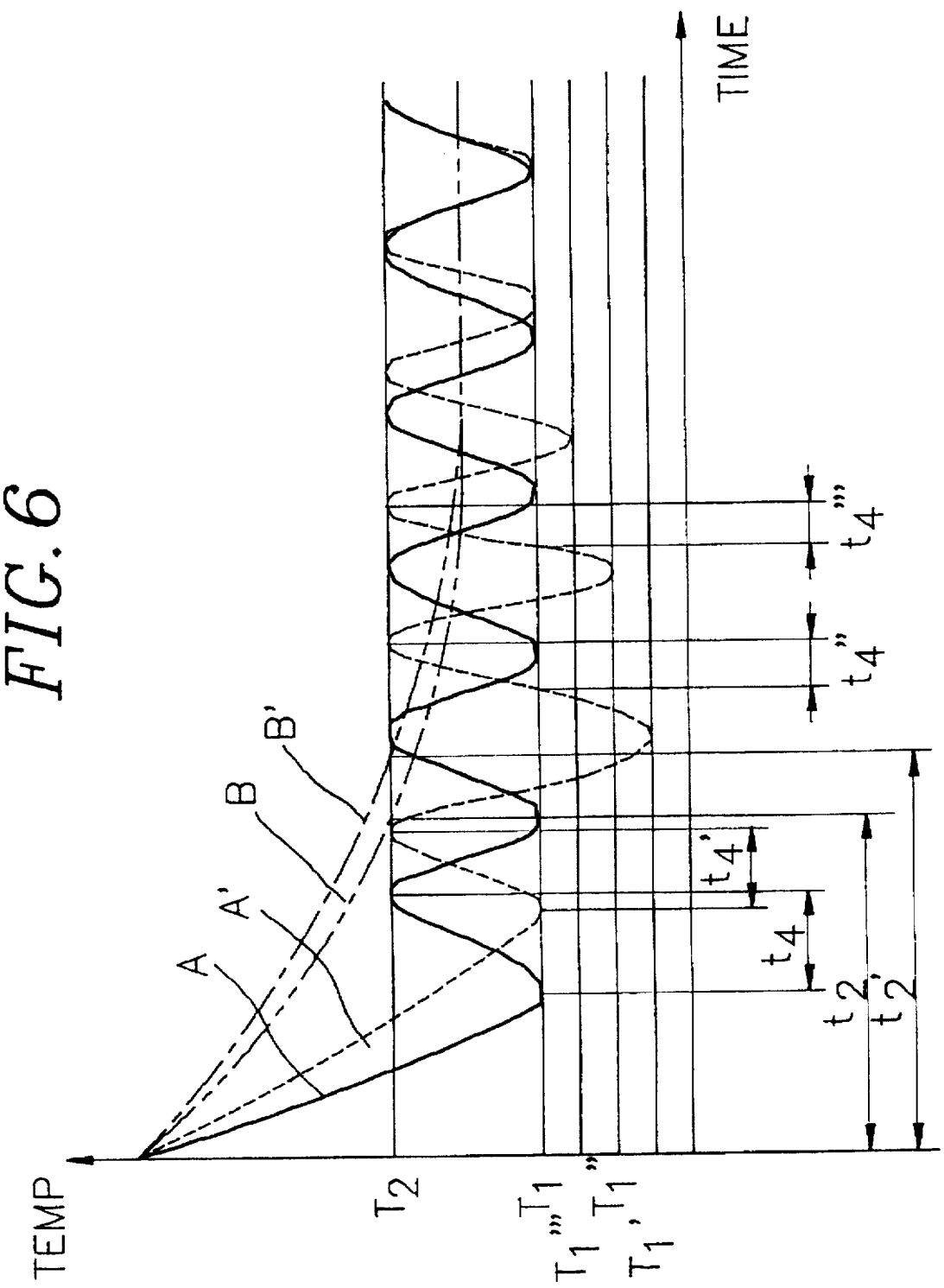

METHOD FOR CONTROLLING TEMPERATURE IN A CHAMBER OF A FOOD STORAGE APPARATUS

FIELD OF THE INVENTION

The present invention relates to a method for controlling temperature in a chamber of a food storage apparatus; and, more particularly, to an improved temperature controlling method capable of shortening an elapsed time for the temperature of an excessive amount of food stored in the chamber to reach a predetermined temperature value.

DESCRIPTION OF THE PRIOR ART

Generally, a food storage apparatus, e.g., a refrigerator, includes a chamber for storing foods and a cooling device for keeping the foods under a low temperature condition.

A conventional temperature controlling process of the food storage apparatus comprises the steps of: inputting a lower and an upper temperature limits T1 and T2; activating the cooling device; deactivating the cooling device at an instant that the temperature of the chamber reaches the lower temperature limit T1; and activating again the cooling device at an instant that the temperature of the chamber reaches the upper temperature T2.

Thus, the temperature of the chamber is kept between the temperature limits T1 and T2, thereby keeping the stored foods fresh.

There are shown in FIGS. 1A and 1B two graphs illustrating temperature variations of the chamber and the stored foods.

When the amount of foods stored in the chamber is normal, the temperatures of the chamber and the foods vary like the temperature variation curves A and B, respectively, as shown in FIG. 1A. On the other hand, when the amount of food stored in the chamber is excessive, the temperatures of the chamber and the foods vary like the temperature variation curves A' and B', respectively, as shown in FIG. 1B.

The temperature variation curves A and A' vary in response to activation/deactivation of the cooling device, and the temperature variation curves B and B' vary in response to the temperature variations of the chamber.

In FIGS. 1A and 1B, t1 and t1' are time periods needed for the temperature of the chamber to reach the lower temperature limit T1 after the cooling device has been initially activated and t2 and t2' are time periods needed for the temperature of the foods to reach the upper temperature limit T2 after the cooling device has been initially activated. Furthermore, t3 and t3' are temperature restoring times of the chamber from T1 to T2 after an initial deactivation of the cooling device. Unprimed and primed notations above refer to the cases when the amount of the foods stored in the chamber is normal and excessive, respectively.

However, in such a conventional temperature controlling process, if an excessive amount of food is stored in the chamber, the time period t2' needed to cool the foods becomes much longer than the time period t2 needed for a case of a normal amount of food, thereby increasing the likelihood of deterioration of the foods.

SUMMARY OF THE INVENTION

It is, therefore, a primary object of the invention to provide an improved temperature controlling method capable of shortening an elapsed time period needed for the temperature of an excessive amount of food stored in a chamber of a food storage apparatus to reach a predetermined lower temperature limit.

In accordance with an aspect of the present invention, there is provided a method for controlling the temperature in a chamber of a food storage apparatus having a cooling device, the method comprising the steps of: (a) inputting a lower and an upper temperature limits T1 and T2, a predetermined elapsed time t1 for the temperature of the chamber storing a normal amount of food to reach the lower temperature limit T1 after the cooling device has been initially activated, a predetermined temperature restoring time t3 needed for the temperature of the chamber to be increased by a temperature difference $\Delta T$ between the lower and the upper temperature limits T1 and T2 from an initial deactivation time of the cooling device, a plurality of compensating values, and a plurality of reference values; (b) setting a variable A to the lower temperature limit T1; (c) activating the cooling device for cooling the chamber of the food storage apparatus; (d) measuring an elapsed time t1' for the temperature of the chamber to reach the lower temperature limit T1 after the cooling device has been activated initially; (e) comparing the elapsed time t1' measured with the predetermined time t1; (f) setting the value of the variable A to one of the compensating values if the elapsed time t1' measured is longer than t1; (g) deactivating the cooling device at an instant when the temperature of the chamber reaches the value of the variable A; (h) activating the cooling device again at an instant when the temperature of the chamber is increased by the difference $\Delta T$; (i) measuring a temperature restoring time t3' from the deactivating time to the subsequent activating time of the cooling device and comparing it with the predetermined temperature restoring time t3; (j) comparing a difference $\Delta t3$ between the temperature restoring time t3' measured and the predetermined temperature restoring time t3 with the reference values, and setting the value of the variable A to one of the compensating values if t3' is less than t3, otherwise setting the value of the variable A to the lower temperature limit T1; and (k) returning to step (g) if electric power to the food storage apparatus is not cut off.

In accordance with another aspect of the present invention, there is provided a method for controlling the temperature in a chamber of a food storage apparatus having a cooling device, the method comprising the steps of: (a) inputting a lower and an upper temperature T1 and T2, a predetermined temperature restoring time t3 of the chamber storing a normal amount of food needed for the temperature of the chamber to reach the upper temperature limit T2 after an initial deactivation of the cooling device, a plurality of compensating values, and a plurality of reference values; (b) setting a variable A to the lower temperature limit T1; (c) activating the cooling device; (d) deactivating the cooling device at an instant when the temperature of the chamber reaches the value of the variable A; (e) activating the cooling device again at an instant when the temperature of the chamber reaches the upper temperature limit T2; (f) measuring a temperature restoring time t3' from T1 to T2 and comparing it with the predetermined temperature restoring time t3; (g) comparing a difference $\Delta t3$ between the temperature restoring time t3' and the predetermined temperature restoring time t3 with the reference values, and setting the value of the variable A to one of the compensating values if t3' is less than t3, otherwise setting the value of the variable A to the lower temperature limit T1; and (h) returning step (d) if electric power to the food storage apparatus is not cut off.

BRIEF DESCRIPTION OF THE DRAWINGS

The above and other objects and features of the instant invention will become apparent from the following description of preferred embodiments taken in conjunction with the accompanying drawings, in which:

FIG. 1A shows a graph illustrating, in case that a normal amount of food is stored in a chamber of a food storage apparatus, temperature variations of the chamber and the foods, the temperature being controlled according to a conventional temperature controlling process;

FIG. 1B offers a graph illustrating, in case that an excessive amount of food is stored in the chamber, temperature variations of the chamber and the foods, the temperature being controlled according to the conventional temperature controlling process;

FIG. 6 sets forth a graph illustrating temperature variations of the chamber and the foods, the temperature being controlled according to the second preferred embodiment of the present invention.

DETAILED DESCRIPTION OF THE PREFERRED EMBODIMENTS

Figure 2:
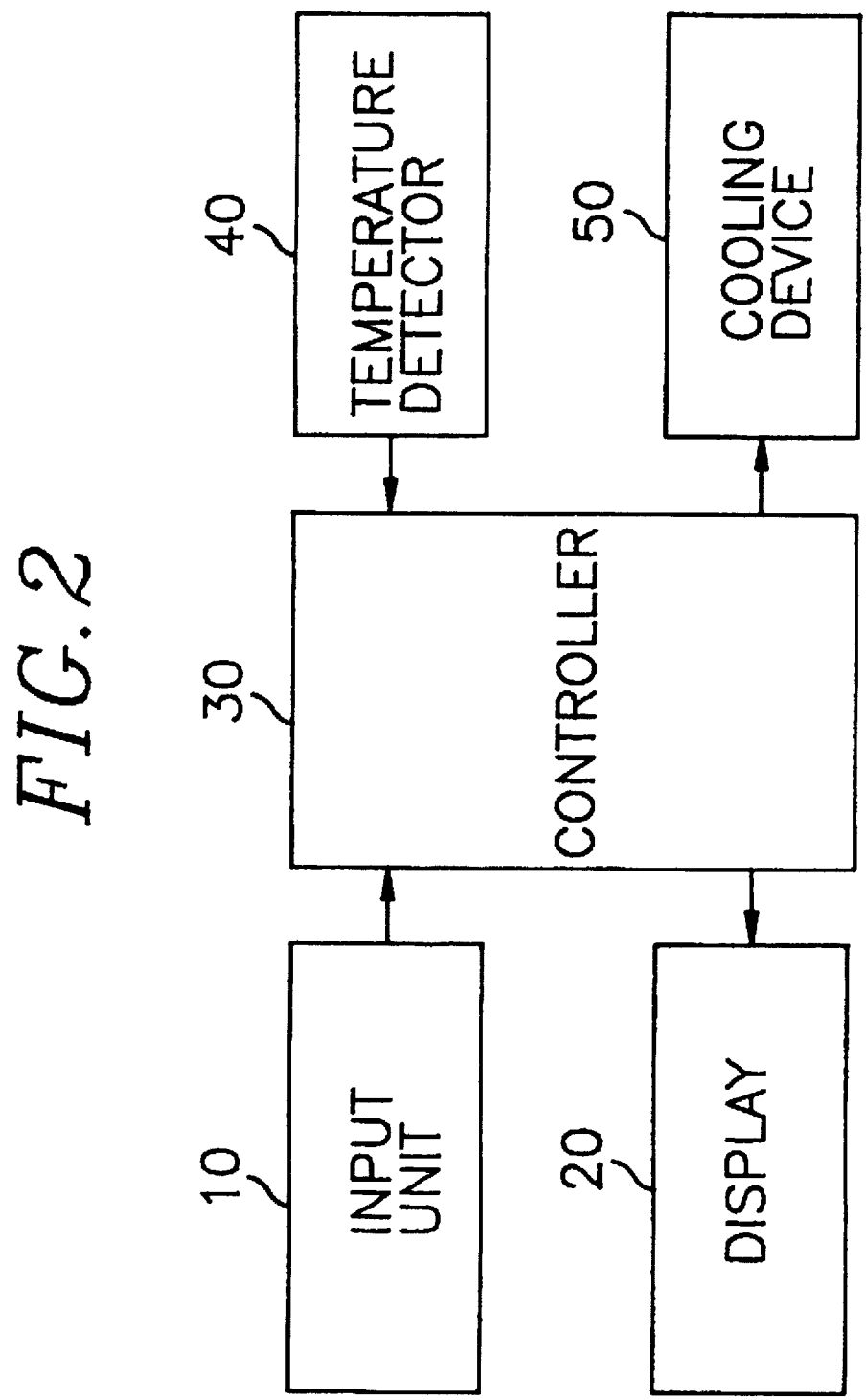
FIG. 2 depicts a block diagram of a system for performing a temperature controlling process in accordance with the present invention.

There is shown in FIG. 2 a block diagram of a system for performing a temperature controlling process in accordance with the present invention.

The system includes an input unit 10 for inputting data, a display 20, a controller 30, a temperature detector 40 and a cooling device, e.g., compressor 50.

The display 20 displays data, e.g., a lower and an upper temperature limits, which have been inputted through the input unit 10.

The controller 30 controls activating/deactivating timings of the cooling device 50 in response to a temperature of the chamber detected through the temperature detector 40.

Figure 3A:
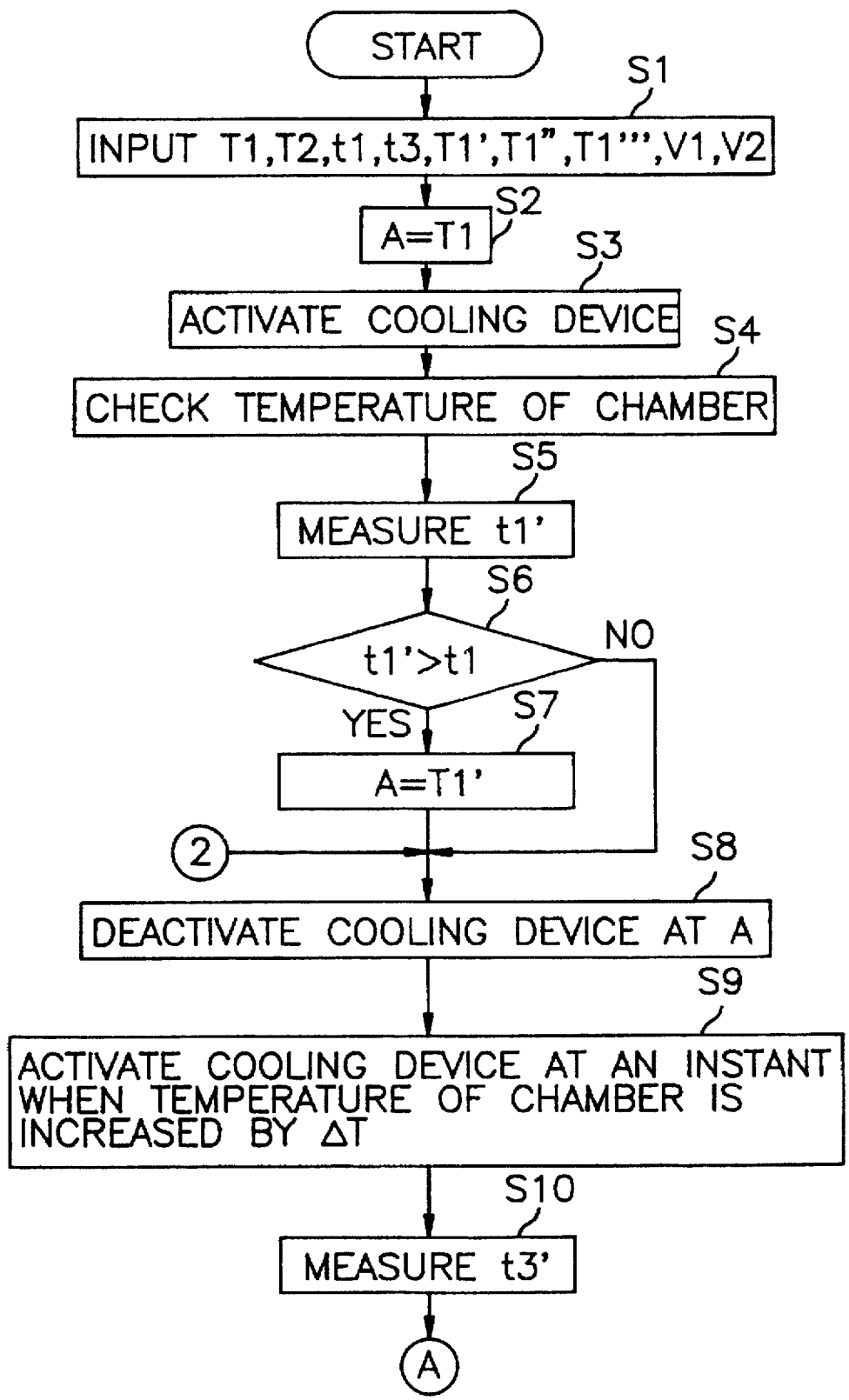
FIGS. 3A and 3B illustrate a flow chart of a preferred embodiment of the temperature controlling process in accordance with the present invention.
Figure 3B:
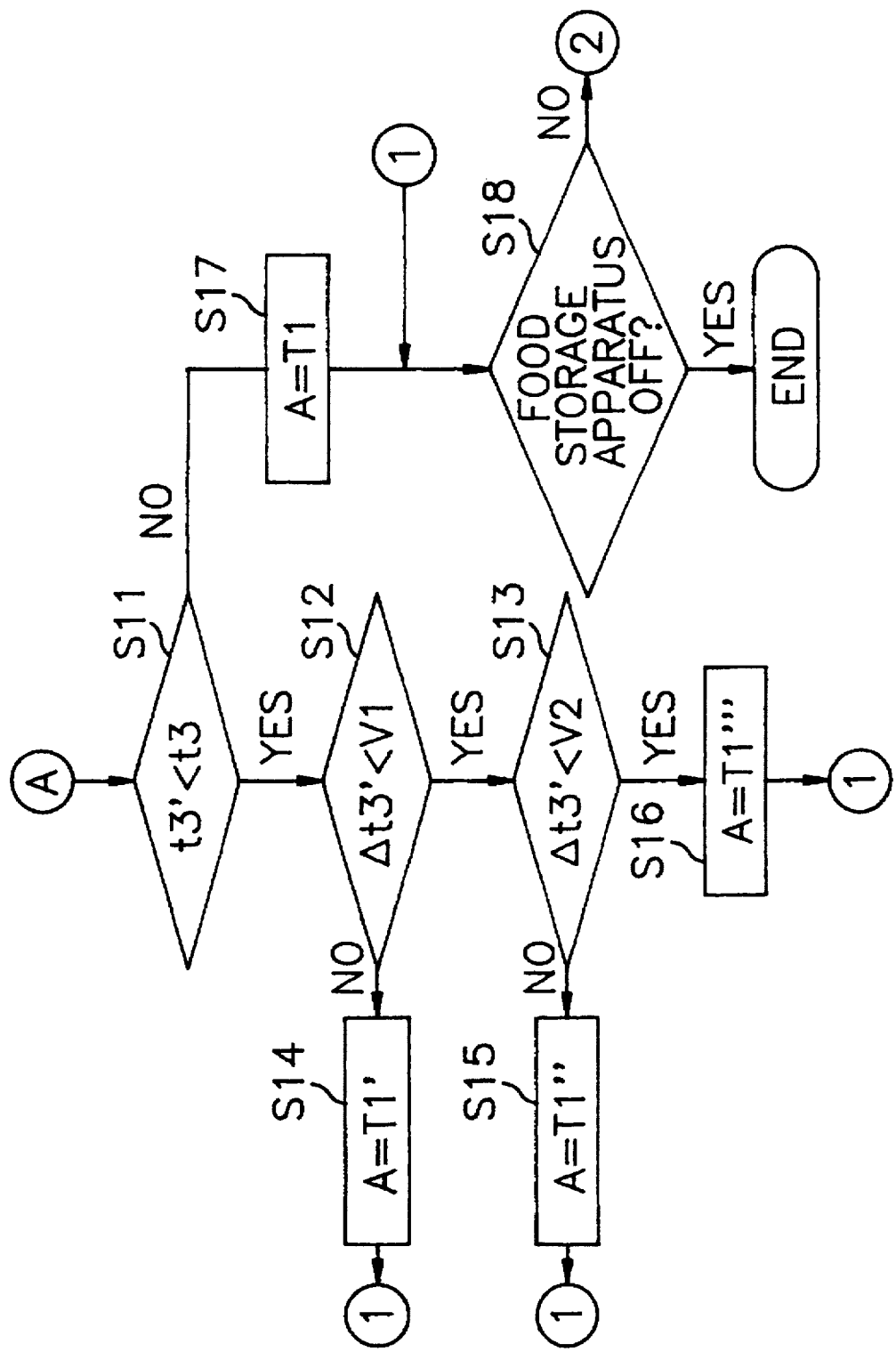
Figure 4:
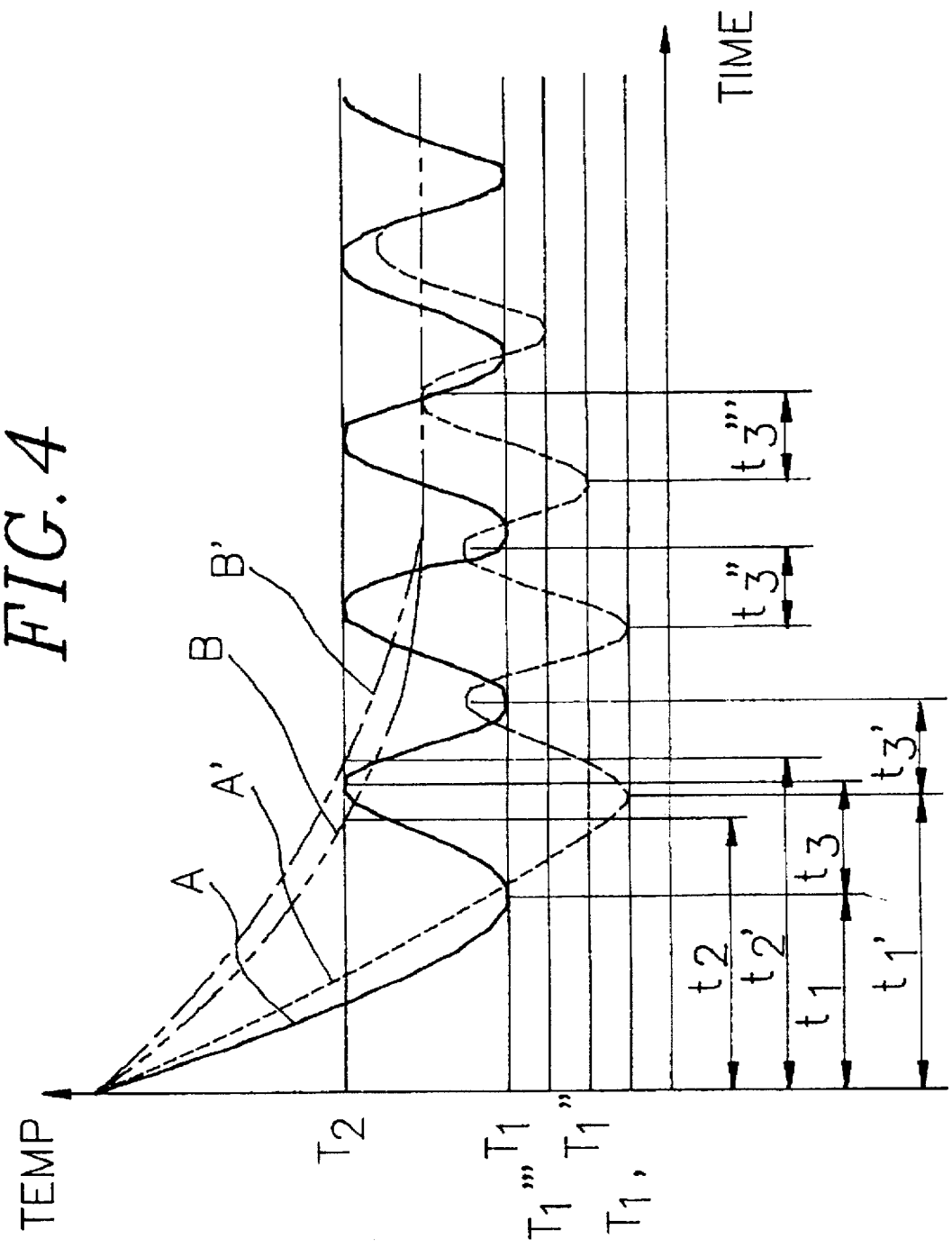
FIG. 4 represents a graph illustrating temperature variations of the chamber and the foods, in case that the temperature being controlled according to the first preferred embodiment of the present invention.

There are shown in FIGS. 3A and 3B, and FIG. 4 a flow chart of a preferred embodiment of the present invention, and a graph illustrating temperature variations of the chamber and the foods stored therein, respectively.

Referring to FIGS. 3A and 3B, in step 1 of the controlling process, an operator inputs a lower and an upper temperature limit T1 and T2, a predetermined elapsed time t1 for the temperature of the chamber storing a normal amount of food to reach the lower temperature limit T1 after the cooling device has been initially activated, a predetermined temperature restoring time t3 needed for the temperature of the chamber storing the normal amount of food to be increased by a difference ΔT between the lower and the upper temperatures T1 and T2 from an initial deactivating time of the cooling device 50, a first, a second and a third compensating values T1', T1" and T1'" (T1'<T1"<T1'"), and a first and a second reference values V1 and V2 (V1>V2).

At step 2, the controller 30 sets a variable A to the lower temperature limit T1. The cooling device 50 is, then, activated (step 3). Subsequently, the controller 30 checks the temperature of the chamber (step 4) and measures an elapsed time t1' for the temperature of the chamber to reach the lower temperature limit T1 after the initial activation of the cooling device 50 (step 5). At step 6, the controller 30 compares the elapsed time t1' measured with the predetermined elapsed time t1, and if the elapsed time t1' measured is larger than t1, the process proceeds to step 7, but if not, goes to step 8. In step 7, the controller 30 sets the value of the variable A to the first compensating value T1'. At step 8, the cooling device 50 is deactivated at an instant when the temperature of the chamber reaches the lower temperature limit T1 or the first compensating value T1'. That is, if the elapsed time t1' measured is determined to be larger than t1, the cooling device 50 is deactivated at the time when the temperature of the chamber is T1', while if the elapsed time t1' measured is determined to be less than or equal to t1, the cooling device 50 is deactivated at the time when the temperature of the chamber is T1. The temperature of the chamber begins to increase after deactivating of the cooling device 50, and the cooling device 50 is activated again at an instant when the temperature of the chamber is increased by the difference ΔT from the deactivating time of the cooling device 50 (step 9). Meanwhile, the controller 30 measures a temperature restoring time t3' of the chamber from the deactivation of the cooling device 50 to the subsequent activation thereof (step 10), and compares it with the predetermined temperature restoring time t3 (step 11). If it is determined the temperature restoring time t3' measured is less than t3, the process proceeds to step 12, but if not, the process proceeds to step 17. In step 12, the controller 30 compares the difference Δt3 between t3' and t3 with the first reference value V1, and if it is determined Δt3 is less than V1, the process proceeds to step 13, but if not, the process proceeds to step 14. In step 13, the controller 30 further compares the difference Δt3 with the second reference value V2 less than V1, and if it is determined Δt3 is less than V2, the process proceeds to step 16, but if not, the process proceeds to step 15. At steps 14, 15, 16 and 17, the controller 30 sets the value of the variable A to the first, the second and the third compensating values T1', T1" and T1'", and the lower temperature limit T1, respectively, and each of steps 14, 15, 15 and 17 proceeds to step 18. In step 18, the controller 30 checks whether or not electric power to the food storage apparatus is cut off, and if it is determined that the electric power is cut off, then the process is finished, but if not, the process returns to step 8 and repeats the above steps from 8 to 18.

Referring now to FIG. 4, the curve A presents temperature variations of the chamber in case when a normal amount of food is stored therein, while the curves A' shows temperature variations of the chamber in case when an excessive amount of food is stored therein. Furthermore, the curve B presents temperature variations of the normal amount of food stored in the chamber, while the curve B' shows temperature variations of the excessive amount of food.

When an excessive amount of or hot foods are stored in the chamber, the elapsed time t1' measured is longer than t1, and the controller 30 determines that the amount of food stored is excessive and modifies the deactivating timing of the cooling device 50 from the lower temperature limit T1 to the first compensating value T1'. Next, the temperature restoring time t3' measured will be less than the predetermined temperature restoring time t3. Accordingly, any one of steps 14 to 16 shown in FIGS. 3A and 3B is, then, performed depending on the amount or the temperature of the foods. In other words, the greater the amount of the foods is or the upper the temperature of the foods is, the lower the compensating value becomes.

In such a temperature controlling process of the present invention, the subsequent temperature restoring times, e.g., t3''' and t3''', normally become progressively longer when no further foods are added. Therefore, at certain instant, the temperature restoring time becomes same as or longer than the predetermined temperature restoring time t3.

Another preferred embodiment of the temperature controlling process in accordance with the present invention will now be described with reference to FIGS. 5 and 6.

Figure 5:
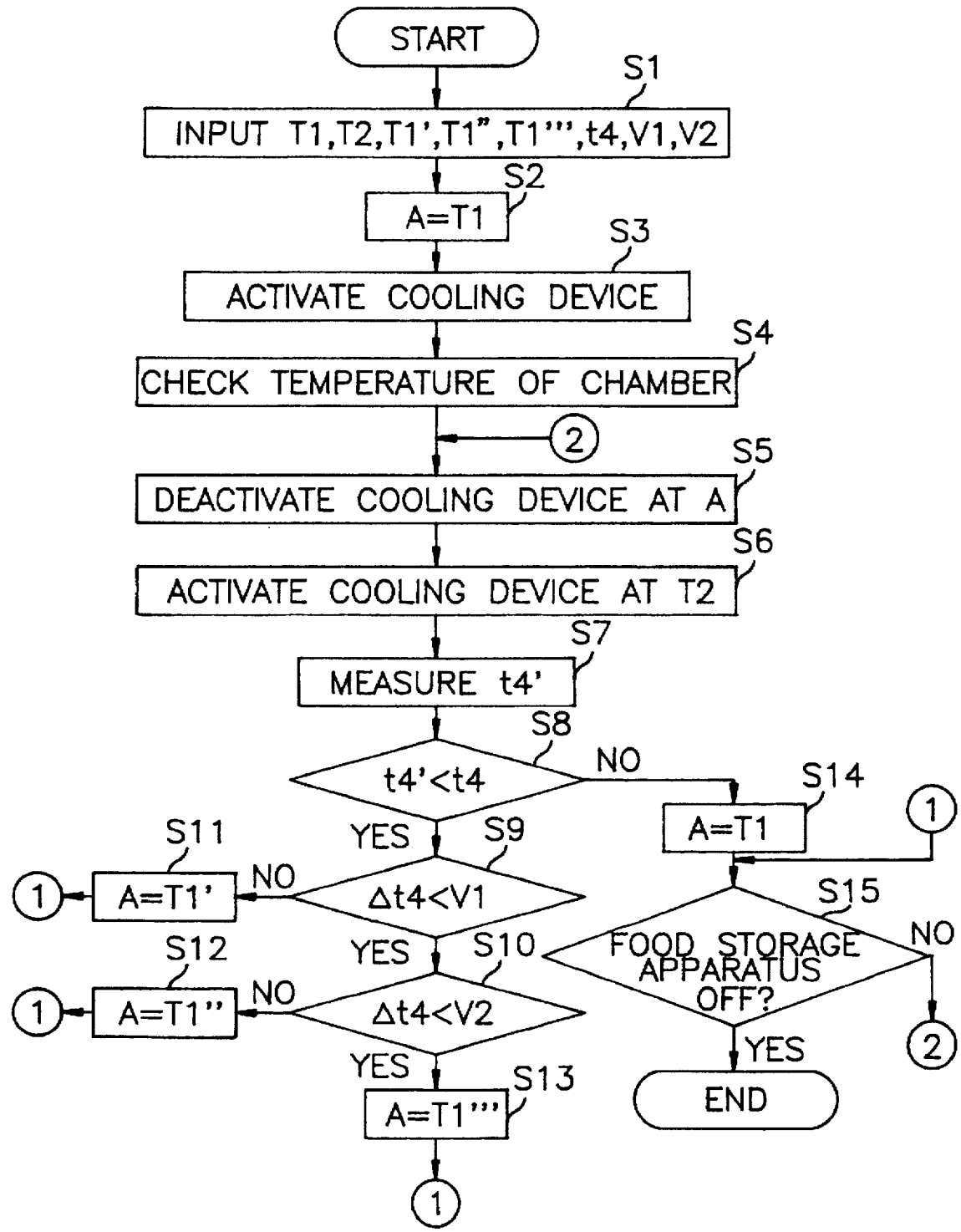
FIG. 5 presents a flow chart of another preferred embodiment of the temperature controlling process in accordance with the present invention.

There are shown in FIG. 5 and 6 a flow chart of a preferred embodiment of the present invention, and a graph illustrating temperature variations of the chamber and the foods stored therein, respectively.

Referring to FIG. 5, in step 1 of the controlling process, an operator inputs a lower and an upper temperature T1 and T2, a predetermined temperature restoring time t4 of the chamber storing a normal amount of food from the lower temperature limit T1 to the upper temperature limit T2 after an initial deactivation of the cooling device 50, a first, a second and a third compensating values T1', T1'' and T1''' (T1'<T1''<T1'''), and a first and a second reference values V1 and V2 (V1>V2).

At step 2, the controller 30 set a variable A to the lower temperature limit T1. The cooling device 50 is, then, activated (step 3). Subsequently, the controller 30 checks the temperature of the chamber (step 4). At step 5, the cooling device 50 is deactivated at the instant when the temperature of the chamber reaches the value of the variable A. The temperature of the chamber begins to increase after deactivating of the cooling device 50, and the cooling device 50 is activated again at the instant when the temperature of the chamber reaches the upper temperature limit T2 (step 6). Meanwhile, the controller 30 measures a temperature restoring time t4' of the chamber from T1 to T2 (step 7), and compares it with the predetermined temperature restoring time t4 (step 8). If it is determined the temperature restoring time t4' measured is less than t4, the process proceeds to step 9, but if not, the process proceeds to step 14. In step 9, the controller 30 compares a difference Δt4 between t4' and t4 with the first reference value V1, and if it is determined Δt4 is less than V1, the process proceeds to step 10, but if not, the process proceeds to step 12. In step 10, the controller 30 further compares the difference Δt4 with the second reference value V2 less than V1, and if it is determined Δt4 is less than V2, the process proceeds to step 11, but if not, the process proceeds to step 12. At steps 11, 12, 13 and 14, the controller 30 sets the value of the variable A to the first, the second and the third compensating values T1', T1'' and T1''', and the lower temperature limit T1, respectively, and each of steps 11, 12, 13 and 14 proceeds to step 15. In step 15, the controller 30 checks whether or not electric power to the food storage apparatus is cut off, and if it is determined the electric power is cut off, then the process is finished, but if not, the process returns to step 5 and repeats the above steps 5 to 15.

Referring now to FIG. 6, the curve A presents temperature variations of the chamber in case when a normal amount of food is stored therein, while the curves A' shows temperature variations of the chamber in case when an excessive amount of food is stored therein. Furthermore, the curve B presents temperature variations of the normal amount of food stored in the chamber, while the curve B' shows temperature variations of the excessive amount of food stored therein.

When an excessive amount of food or hot foods are stored in the chamber, the temperature restoring time t4' will be less than the predetermined temperature restoring time t4. Accordingly, any one of steps 11 to 13 shown in FIG. 5 is, then, performed depending on the amount or the temperature of the foods. In other words, the greater the amount of the foods is or the upper the temperature of the foods is, the lower the compensating value becomes.

In such a temperature controlling process in accordance with the second preferred embodiment of the present invention, the subsequent temperature restoring times, e.g., t4'' and t4''', normally become progressively longer when no further foods are added. Therefore, at certain instant, the temperature restoring time becomes same as or longer than the predetermined temperature restoring time t4.

According to the temperature controlling process of the present invention, in case when an excessive amount of food or hot foods are stored in the chamber of the food storage apparatus, an elapsed time t2' for the temperature of the foods to reach the upper temperature limit T2 after an initial activation of the cooling device 50 is shortened as compared with the prior art process, thereby decreasing the likelihood of deterioration of the foods.

Although the invention has been shown and described with respect to the preferred embodiments, it will be understood by those skilled in the art that various changes and modifications may be made without departing from the spirit and scope of the invention as defined in the following claims.

What is claimed is:

1. A method for controlling temperature in a chamber of a food storage apparatus having a cooling device, the method comprising the steps of:

(a) inputting a lower and an upper temperature limit T1 and T2, a predetermined elapsed time t1 for the temperature of the chamber storing a normal amount of food to reach the lower temperature limit T1 after the cooling device has been initially activated, a predetermined temperature restoring time t3 needed for the temperature of the chamber storing the normal amount of food to be increased by a difference ΔT between the lower and the upper temperature limits T1 and T2 from an initial deactivation of the cooling device, a plurality of compensating values, and a plurality of reference values;

(b) setting a variable A to the lower temperature limit T1;

(c) activating the cooling device for cooling the chamber of the food storage apparatus;

(d) measuring an elapsed time t1' for the temperature of the chamber to reach the lower temperature limit T1 after the cooling device has been activated initially;

(e) comparing the elapsed time t1' measured with the predetermined elapsed time t1;

(f) setting the value of the variable A to one of the compensating values if the elapsed time t1' measured is longer than t1;

(g) deactivating the cooling device at an instant when the temperature of the chamber reaches the value of the variable A;

(h) activating the cooling device again at an instant when the temperature of the chamber is increased by the difference ΔT;

(i) measuring a temperature restoring time t3' of the chamber from the deactivating time to the subsequent activating time of the cooling device and comparing it with the predetermined temperature restoring time t3;

(j) comparing a difference Δt3 between the temperature restoring time t3' measured and the predetermined temperature restoring time t3 with the reference values, and setting the value of the variable A to one of the compensating values if t3' is less than t3, otherwise setting the value of the variable A to the lower temperature limit T1; and (k) returning to step (g) if electric power to the food storage apparatus is not cut off.

2. The method according to claim 1, wherein the reference values are V1 and V2, where V1 is greater than V2, and the compensating values are T1', T1" and T1'", where (T1'T1"<T1'").

3. The method according to claim 2, wherein if the temperature restoring time t3' measured is less than t3 and the difference Δt3 is larger than or equal to the first reference value V1, the cooling device is deactivated at an instant when the temperature of the chamber reaches the first compensating value T1'.

4. The method according to claim 2, wherein if the temperature restoring time t3' measured is less than t3 and the difference Δt3 is less than V1 and larger than or equal to the second reference value V2, the cooling device is deactivated at an instant when the temperature of the chamber reaches the second compensating value T1".

5. The method according to claim 2, wherein if the temperature restoring time t3' measured is less than t3 and the difference Δt3 is less than V2, the cooling device is deactivated at an instant when the temperature of the chamber reaches the third compensating value T1'".

6. A method for controlling temperature in a chamber of a food storage apparatus having a cooling device, the method comprising the steps of:

(a) inputting a lower and an upper temperature limits T1 and T2, a predetermined temperature restoring time t4 of the chamber storing a normal amount of food from T1 to T2 after an initial deactivation of the cooling device, a plurality of compensating values, and a plurality of reference values;

(b) setting a variable A to the lower temperature limit T1;

(c) activating the cooling device;

(d) deactivating the cooling device at an instant when the temperature of the chamber reaches the value of the variable A;

(e) activating the cooling device again at an instant when the temperature of the chamber reaches the upper temperature limit T2;

(f) measuring a temperature restoring time t4' of the chamber from T1 to T2 and comparing it with the predetermined temperature restoring time t4;

(g) comparing a difference Δt4 between the temperature restoring time t4' measured and the predetermined temperature restoring time t4 with the reference values, and setting the value of the variable A to one of the compensating values if t4' is less than t4, otherwise setting the value of the variable A to the lower temperature limit T1; and (h) returning step (d) if electric power to the food storage apparatus is not cut off.

7. The method according to claim 6, wherein the reference values are V1 and V2 (V1>V2) and the compensating values are T1', T1" and T1'" (T1'<T1"<T1'").

8. The method according to claim 7, wherein if the temperature restoring time t4' measured is less than t4 and the difference value Δt4 is larger than or equal to the first reference value V1, the cooling device is deactivated at an instant when the temperature of the chamber reaches the first compensating value T1'.

9. The method according to claim 7, wherein if the temperature restoring time t4' measured is less than t4 and the difference value Δt4 is less than V1 and larger than or equal to the second reference value V2, the cooling device is deactivated at an instant when the temperature of the chamber reaches the second compensating value T1".

10. The method according to claim 7, wherein if the temperature restoring time t4' measured is less than t4 and the difference value Δt4 is less than V2, the cooling device is deactivated at an instant when the temperature of the chamber reaches the third compensating value T1'".

\* \* \* \* \*